(12) United States Patent
Tsurumoto et al.

(10) Patent No.: US 8,830,406 B2
(45) Date of Patent: Sep. 9, 2014

(54) OPERATION APPARATUS, INFORMATION PROCESSING METHOD THEREFOR, AND INFORMATION PROCESSING APPARATUS

(75) Inventors: Takashi Tsurumoto, Saitama (JP); Toshihiko Fushimi, Tokyo (JP); Ikuo Yamano, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/238,642

(22) PCT Filed: Aug. 24, 2012

(86) PCT No.: PCT/JP2012/005311
§ 371 (c)(1),
(2), (4) Date: Feb. 12, 2014

(87) PCT Pub. No.: WO2013/031158
PCT Pub. Date: Mar. 7, 2013

(65) Prior Publication Data
US 2014/0192269 A1    Jul. 10, 2014

(30) Foreign Application Priority Data
Aug. 31, 2011  (JP) ................... 2011-189439

(51) Int. Cl.
*H04N 5/44*  (2011.01)
*G05B 11/01*  (2006.01)

(52) U.S. Cl.
USPC ........................ 348/734; 340/12.22

(58) Field of Classification Search
USPC ............. 348/734, 725; 725/37; 340/12.22, 340/12.55, 13.32
IPC ..................................... H04N 5/44
See application file for complete search history.

(56) References Cited

U.S. PATENT DOCUMENTS

| 6,518,956 | B1 | 2/2003 | Sato |
| 7,259,710 | B2* | 8/2007 | Kisliakov ................ 348/734 |
| 7,801,566 | B2 | 9/2010 | Oga |
| 8,050,721 | B2 | 11/2011 | Oga |
| 8,326,369 | B2 | 12/2012 | Oga |
| 8,379,155 | B2 | 2/2013 | Morioka et al. |
| 8,509,855 | B2 | 8/2013 | Oga |
| 2012/0287350 | A1* | 11/2012 | Song et al. ................ 348/734 |

FOREIGN PATENT DOCUMENTS

| JP | 04-148412 A | 5/1992 |
| JP | 6-89634 | 3/1994 |
| JP | 2001-051799 A | 2/2001 |
| JP | 2001-147775 A | 5/2001 |
| JP | 2009-187290 A | 8/2009 |
| JP | 2011-034294 A | 2/2011 |
| WO | 2005-010740 A1 | 2/2005 |

* cited by examiner

*Primary Examiner* — Sherrie Hsia
(74) *Attorney, Agent, or Firm* — Lerner, David, Littenberg, Krumholz & Mentlik, LLP

(57) ABSTRACT

[Object] To provide an operation apparatus capable of achieving an improvement in operability.
[Solving Means] This operation apparatus includes: a casing including two surfaces opposed in front and back directions as a first surface and a second surface; a first operation input unit that is provided in the first surface and includes a detector that performs a detection of an operation of a user with respect to a predetermined coordinate detection space on the first surface; a second operation input unit provided in the second surface; a determination unit that determines an attitude of the casing when an operation of the user with respect to the coordinate detection space of the detector is performed from a side of the second surface; and a converter that converts, when the attitude is determined, information detected by the detector into information of a coordinate system of the coordinate detection space seen through from the side of the second surface.

11 Claims, 12 Drawing Sheets ically operates an information processing apparatus such as a television receiver, to an information processing method therefor, and to an information processing apparatus being a control target of the operation apparatus.

OPERATION APPARATUS, INFORMATION PROCESSING METHOD THEREFOR, AND INFORMATION PROCESSING APPARATUS

The present application is a national phase entry under 35 U.S.C. §371 of International Application No. PCT/JP2012/005311 filed Aug. 24, 2012, published on Mar. 7, 2013 as WO 2013/031158 A1, which claims priority from Japanese Patent Application No. JP 2011-189439 filed in the Japanese Patent Office on Aug. 31, 2011.

TECHNICAL FIELD

The present technology relates to an operation apparatus that remotely operates an information processing apparatus such as a television receiver, to an information processing method therefor, and to an information processing apparatus being a control target of the operation apparatus.

BACKGROUND ART

As a wireless operation terminal that remotely controls an information processing apparatus such as a television receiver, an infrared remote controller utilizing an infrared communication has been a mainstream. However, the infrared remote controller has a high directivity of an infrared ray, and hence it has been necessary to direct the remote controller, a light-emitting unit of an infrared ray, to a control-target apparatus. However, the directivity of a radio wave is relatively low, and hence, in recent years, a radio frequency (RF) remote controller utilizing a high-frequency radio wave has been developed and is becoming a mainstream. Further, attempts to standardize the RF remote controller are conducted by organizations.

For example, in accordance with near field communication standard IEEE (registered trademark) (institute of electrical and electronic engineers) 802.15.4, ZigBee (registered trademark) is standardized as specifications for a network layer, a security layer, and an application layer, which correspond to upper layer of IEEE (registered trademark) 802.15.4. In addition, based on IEEE (registered trademark) 802.15.4, RF remote control standard ZigBee (registered trademark) RF4CE (radio frequency for consumer electronics) is standardized by trade organizations.

For example, Patent Document 1 discloses a technique relating to an operation terminal that controls an information processing apparatus such as a television receiver using an RF wireless signal such as RF4CE. Further, Patent Document 2 describes a remote control apparatus including a casing formed of a six-sided rectangular parallelepiped, which has two main surfaces in which operation keys are provided. This remote control apparatus detects which of the two main surfaces is on the front side and invalidates an operation key of the main surface on the back side.

Patent Document 1: Japanese Patent Application Laid-open No. 2011-034294
Patent Document 2: Japanese Patent Application Laid-open No. HEI 6-89634

SUMMARY OF INVENTION

Problem to be Solved by the Invention

By the way, in recent years, information processing apparatuses have become remarkably multifunctional. For example, there is a television receiver or the like that is connected to the Internet to be capable of using various services on the Internet. Therefore, also in an operation apparatus for remotely controlling such a multifunctional information processing apparatus, necessities for a pointing device such as a touch pad and a keyboard are increased. However, an installation space is required because the pointing device and the keyboard needs a certain surface size, which contributes to an increase in size of the operation apparatus. In view of this, the provision of the keyboard, the touch pad, and the like in two surfaces of the operation apparatus that are opposed in front and back directions is under consideration. In the case where such a configuration is employed, various improvements for improving the operability are expected.

In view of the above-mentioned circumstances, it is an object of the present technology to provide an operation apparatus capable of achieving an improvement in operability, an information processing method for the operation apparatus, and an information processing apparatus.

Means for Solving the Problem

In order to solve the above-mentioned problems, an operation apparatus being an aspect according to the present technology includes: a casing including two surfaces opposed in front and back directions as a first surface and a second surface; a first operation input unit that is provided in the first surface and includes a detector that performs a detection of an operation of a user with respect to a predetermined coordinate detection space on the first surface; a second operation input unit provided in the second surface; a determination unit that determines an attitude of the casing when an operation of the user with respect to the coordinate detection space of the detector is performed from a side of the second surface; and a converter that converts, when the attitude is determined, information detected by the detector into information of a coordinate system of the coordinate detection space seen through from the side of the second surface.

The detector may detect coordinates specified by the user with respect to the coordinate detection space, and the converter may perform a conversion by calculation formulae $$X' = \alpha - Y$$

$$Y' = \beta - X$$

where coordinates detected by the detector are denoted by (X, Y), detection coordinates in a coordinate system of the coordinate detection space seen through from the side of the second surface are denoted by (X', Y'), a length of the coordinate detection space in a Y-axis direction is denoted by $\alpha$, and a length of the coordinate detection space in an X-axis direction is denoted by $\beta$.

In the above-mentioned operation apparatus, the first operation input unit may include one or more key operation units together with the detector, and the operation apparatus may further include a control unit that puts a detection of an operation of the key operation unit in a stop state when the attitude is determined.

The control unit may put the determination of the attitude in the stop state when information is output from the detector.

The control unit may put the determination of the attitude in the stop state when the second operation input unit is operated.

The operation apparatus according to the present technology may further include an imaging unit that is capable of capturing an image of a front side of either one of the first surface and the second surface, and the determination unit may determine the attitude based on the image captured by the imaging unit.

The converter may perform a conversion by calculation formulae $$X' = \alpha - X$$

$$Y' = Y$$

where detection coordinates obtained in a coordinate system of the coordinate detector are denoted by (X, Y), detection coordinates in a coordinate system of the coordinate detection space seen through from the side of the second surface are denoted by (X', Y'), a length of a detection space of the coordinate detector in the Y-axis direction is denoted by $\alpha$.

The detector may detect movement information according to an operation of the user with respect to the coordinate detection space, and the converter may perform a conversion by calculation formulae $$x' = -y$$

$$y' = -x$$

where the movement information detected by a coordinate system of the coordinate detector is denoted by (x, y) and movement information in the coordinate system of the coordinate detection space seen through from the side of the second surface is denoted by (x', y').

The detector may detect movement information according to an operation of the user with respect to the coordinate detection space, and the converter may perform a conversion by calculation formulae $$x' = -x$$

$$y' = y$$

where movement information obtained in the coordinate system of the coordinate detector is denoted by (x, y) and the movement information of the coordinate system of the coordinate detection space seen through from the side of the second surface is denoted by (x', y').

An information processing method for an operation apparatus being another aspect according to the present technology includes: determining an attitude of a casing including a first surface in which a first operation input unit is provided and a second surface in which a second operation input unit is provided, the first operation input unit including a detector that performs a detection of an operation of a user with respect to a predetermined coordinate detection space, the second surface being opposed to the first surface in front and back directions, the attitude of the casing being an attitude when an operation of the user with respect to the coordinate detection space of the detector is performed from a side of the second surface; and converting, when the attitude is determined, information detected by the detector into information of a coordinate system of the coordinate detection space seen through from the side of the second surface.

An information processing apparatus being another aspect according to the present technology includes: for an operation apparatus including a casing including two surfaces opposed in front and back directions as a first surface and a second surface, a first operation input unit that is provided in the first surface and includes a detector that performs a detection of an operation of a user with respect to a predetermined coordinate detection space on the first surface, and a second operation input unit provided in the second surface, a determination unit that determines an attitude of the casing when an operation of the user with respect to the coordinate detection space of the detector is performed from a side of the second surface; and a converter that converts, when the attitude is determined, information detected by the detector into information of a coordinate system of the coordinate detection space seen through from the side of the second surface.

Effect of the Invention

As described above, according to the present technology, it is possible to provide an operation apparatus having high operability.

MODE(S) FOR CARRYING OUT THE INVENTION

Hereinafter, an embodiment according to the present technology will be described with reference to the drawings.

This embodiment relates to an operation apparatus that remotely operates an information processing apparatus such as a television receiver, a game console, a recorder, and a personal computer through a transmission channel such as a cable transmission signal, an Ir signal, an RF signal, and a wireless LAN.

In recent years, information processing apparatuses have become remarkably multifunctional. For example, there is a television receiver or the like that is connected to the Internet to be capable of using various services on the Internet. In view of this, there has also been introduced a remote operation apparatus installing a QWERTY keyboard including a normal key arrangement employed in, for example, a keyboard for a personal computer, a touch pad, and the like. Further, in the case where the QWERTY keyboard, the touch pad, and the like are placed in a single surface as viewed from the user, the surface size of the operation apparatus increases, which leads to an increase in size of the operation apparatus. In view of this, the provision of the QWERTY keyboard and the pointing device such as the touch pad in two surfaces of the operation apparatus that are opposed in front and back directions is under consideration.

In the case where the QWERTY keyboard, the touch pad, and the like are placed in the two surfaces of the operation apparatus that are opposed in the front and back directions, as an operation mode of the touch pad and the like, a mode of operating the touch pad and the like with the surface in which the QWERTY keyboard is placed being directed to the user is assumed. When the touch pad in the back surface is operated with the surface in which the QWERTY keyboard is placed being directed to the user, it is necessary for the user to perform an operation while being aware of viewing a coordinate system of the touch pad from the back side and it is difficult to perform an intuitive operation. Thus, the operability is significantly lowered.

The operation apparatus according to this embodiment includes a built-in detector such as an acceleration sensor necessary for detecting the attitude. This operation apparatus detects the attitude based on a detection value of the detector and determines which of the surfaces, a first surface in which the touch pad is placed and a second surface in which the QWERTY keyboard is placed, faces the user and determines the vertical and horizontal attitude orientation of the operation apparatus. Based on the determination result, the operation apparatus converts information of the coordinates and the like detected by the touch pad into information of a coordinate system of a coordinate detection space of the touch pad seen through from a side of the second surface depending on needs.

Hereinafter, an operation apparatus according to this embodiment will be described in detail.

First Embodiment

Figure 1:
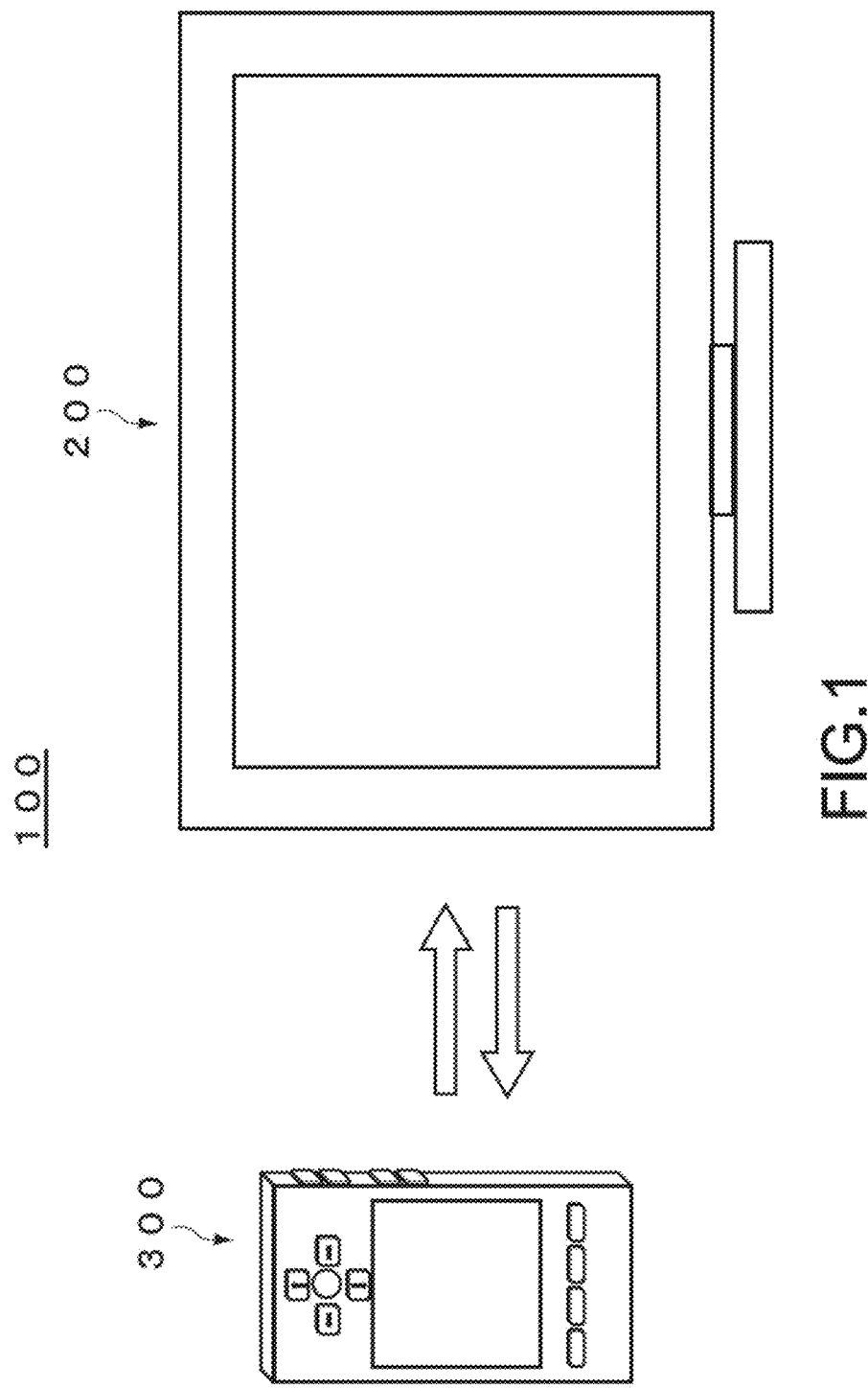
FIG. 1 A block diagram showing a configuration of an information processing system of a first embodiment according to the present technology.

FIG. 1 is a block diagram showing a configuration of an information processing system in a first embodiment according to the present technology. As shown in the figure, an information processing system 100 in this embodiment includes an information processing apparatus 200 being an operation target and an operation apparatus 300 that remotely operates the information processing apparatus 200. The information processing apparatus 200 may be any apparatus as long as it has a hardware configuration of a basic computer, for example, a television receiver, a personal computer, a recorder, a player, a game machine, or the like. Alternatively, the information processing apparatus 200 may be an apparatus that is connected to a network such as the Internet to enable viewing of a web page and the like to be performed.

[Configuration of Information Processing Apparatus 200]

Figure 2:
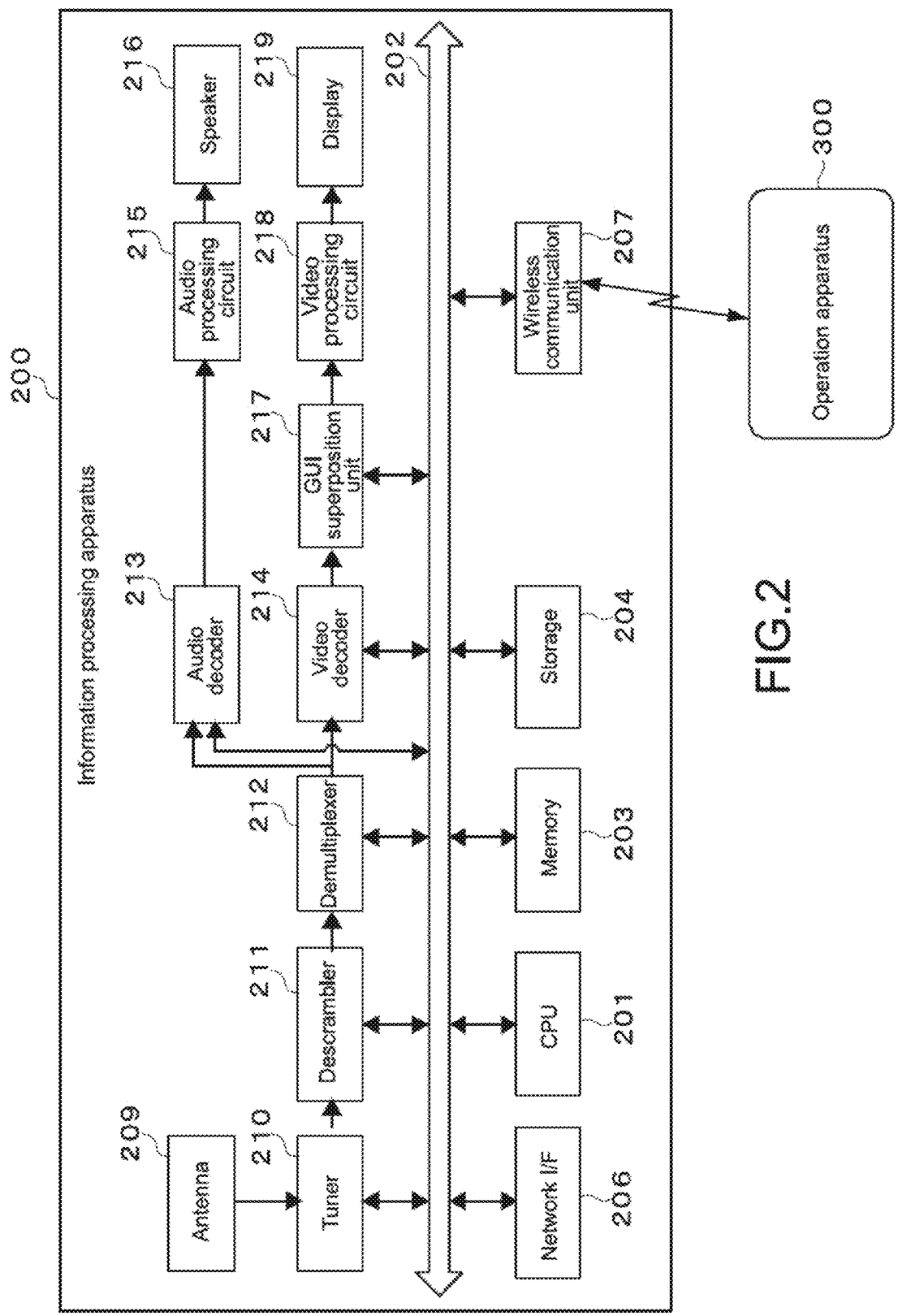
FIG. 2 A view showing a hardware configuration of an information processing apparatus of FIG. 1.

FIG. 2 is a view showing a hardware configuration of the information processing apparatus 200.

In this embodiment, a case where a television receiver is used as the information processing apparatus 200 will be described.

The information processing apparatus 200 includes a central processing unit (CPU) 201, a bus 202, a memory 203, storage 204, a network I/F 206, and a wireless communication unit 207. The information processing apparatus 200 further includes an antenna 209, a tuner 210, a descrambler 211, a demultiplexer 212, an audio decoder 213, a video decoder 214, an audio processing circuit 215, a speaker 216, a GUI superposition unit 217, a video processing circuit 218, and a display 219.

In the information processing apparatus 200, the CPU 201 executes various types of processing according to programs stored in the memory 203 or the storage 204 connected via the bus 202.

The wireless communication unit 207 performs a wireless bi-directional signal communication with the operation apparatus 300. Examples of the wireless communication system include an infrared (IR) system, an RF system such as radio frequency for consumer electronics (RF4CE) being an international standard of an RF remote controller for a home electric appliance, and a wireless LAN compatible for IEEE 802.11b standard or the like.

The antenna 209 receives a digital broadcast signal or the like and inputs it into the tuner 210.

The tuner 210 extracts a broadcast signal of a predetermined channel from the digital broadcast signal. The tuner 210 outputs a transport stream of the predetermined channel that is obtained by subjecting the extracted broadcast signal to decoding processing, to the descrambler 211.

The descrambler 211 uses a release key that is in advance stored in a predetermined IC card (not shown) mounted on the information processing apparatus 200, to release the scramble of the transport stream input from the tuner 210. The descrambler 211 outputs the transport stream whose scramble has been released to the demultiplexer 212.

The demultiplexer 212 demultiplexes audio data and video data from the transport stream whose scramble has been released, the transport stream being input from the descrambler 211. The demultiplexer 212 outputs the demultiplexed audio data to the audio decoder 213, and outputs the demultiplexed video data to the video decoder 214.

The audio decoder 213 decodes the audio data input from the demultiplexer 212, and outputs the obtained audio data to the audio processing circuit 215.

The audio processing circuit 215 subjects the audio data input from the audio decoder 213 to digital/analog (D/A) conversion, amplification processing, or the like, and outputs the obtained audio signal to the speaker 216.

The video decoder 214 decodes the video data input from the demultiplexer 212 and outputs the obtained video data to the graphical user interface (GUI) superposition unit 217.

The GUI superposition unit 217 superposes graphic data such as on screen display (OSD) on the video data input from the video decoder 214 and outputs it to the video processing circuit 218.

The video processing circuit 218 subjects the video data input from the GUI superposition unit 217 to predetermined image processing, digital/analog (D/A) conversion, or the like, and outputs the obtained video signal to the display 219.

Further, the CPU 201 is capable of receiving digital broadcasting based on an operation signal relating to recording from the operation apparatus 300 or information for programmed recording that is set in the memory 203, obtaining a transport stream of a predetermined channel, and storing this as video-audio data of a program in the storage 204.

In this manner, the information processing apparatus 200 is capable of receiving digital broadcasting and outputting that program through the display 219 and the speaker 216 in a viewable state or recording it in the storage 204. Further, the CPU 201 is also capable of accessing the Internet through the network I/F 206 or displaying an obtained web page on the display 219.

[Configuration of Operation Apparatus 300]

Next, a configuration of the operation apparatus 300 will be described.

Figure 3:
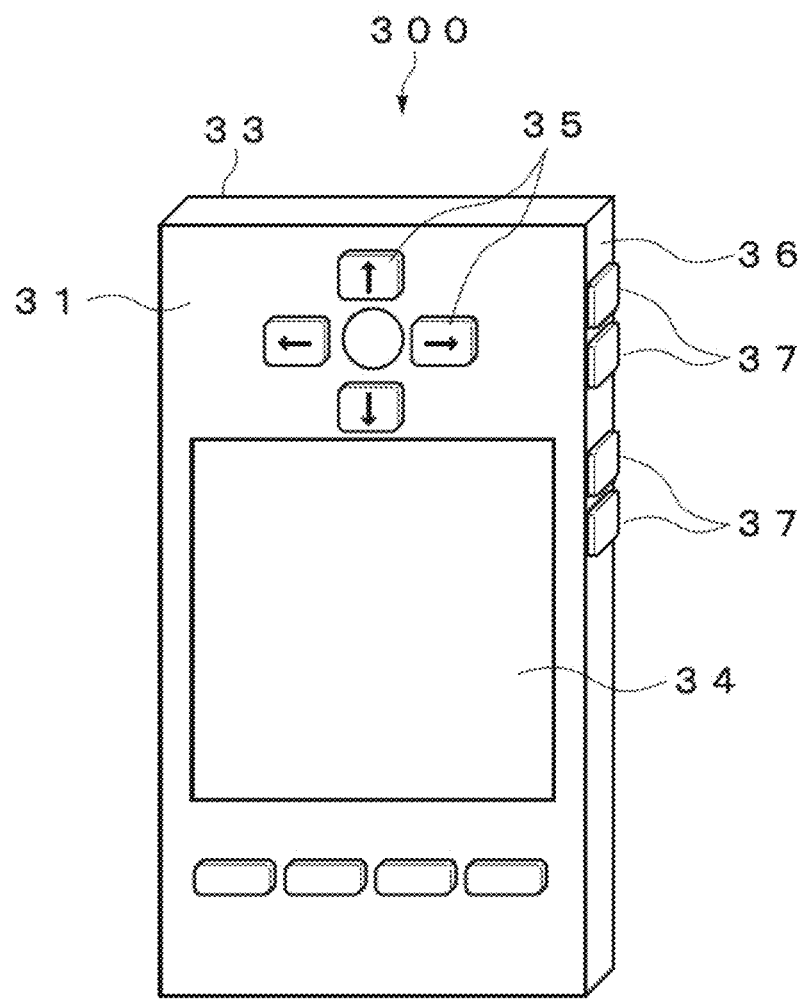
FIG. 3 An outer appearance view on a side of a remote-controller surface of the operation apparatus of FIG. 1.
Figure 4:
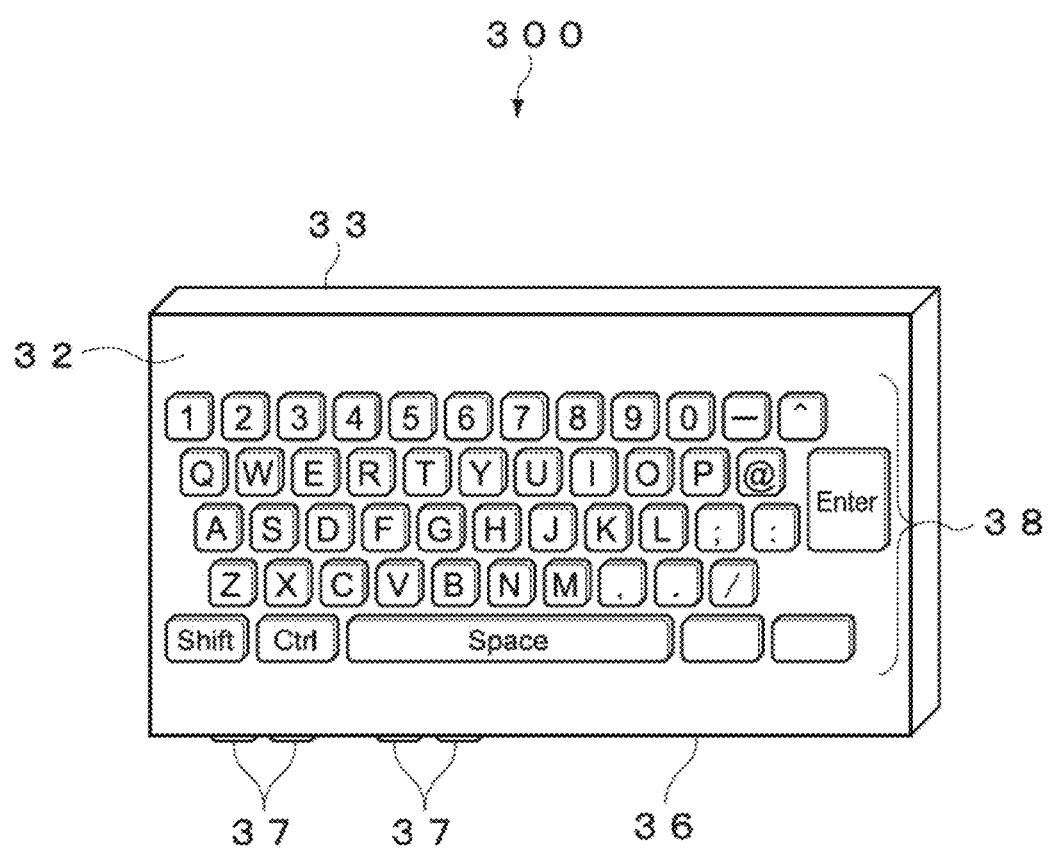
FIG. 4 An outer appearance view on a side of a keyboard surface of the operation apparatus of FIG. 1.

FIG. 3 is an outer appearance view on a side of a remote-controller surface of the operation apparatus 300. FIG. 4 is an outer appearance view on a side of a keyboard surface of the operation apparatus 300.

As shown in FIGS. 3 and 4, the operation apparatus 300 includes two rectangular surfaces opposed in front and back directions as main surfaces 31 and 32, and a casing 33 having a rectangular parallelepiped shape with a total of six surfaces, the surfaces having a sufficiently smaller size in an axis direction (depth direction) than the size of the main surfaces 31 and 32 in two axis directions, the axis direction (depth direction) being orthogonal to those two axes. Both of the two main surfaces opposed in the front and back directions are operation surfaces for the user. Specifically, in the one main surface 31 (also referred to as "remote-controller surface 31"), a touch pad 34 and keys of cursor keys 35 and the like are provided as a first operation input unit. The touch pad 34 is located in an almost center area of the one main surface 31. That is because the operation of the touch pad 34 becomes a blind operation for the user upon operation in a keyboard operation attitude (to be described later). A certain degree of blind operability of the touch pad 34 can be ensured by causing the center of the remote-controller surface 31 to correspond or almost correspond to a center coordinate of the touch pad 34. In the other main surface 32 (also referred to as "keyboard surface 32") in an opposed relationship to the remote-controller surface 31 of the casing 33 in the front and back directions, a keyboard 38 such as a QWERTY keyboard is provided as a second operation input unit. Out of four surfaces (hereinafter, each referred to as "side surface") other than the remote-controller surface 31 and the keyboard surface 32 of the casing 33, in at least one side surface 36, a plurality of frequently used keys 37 of volume control, channel selection, or the like are, for example, provided.

Figure 5:
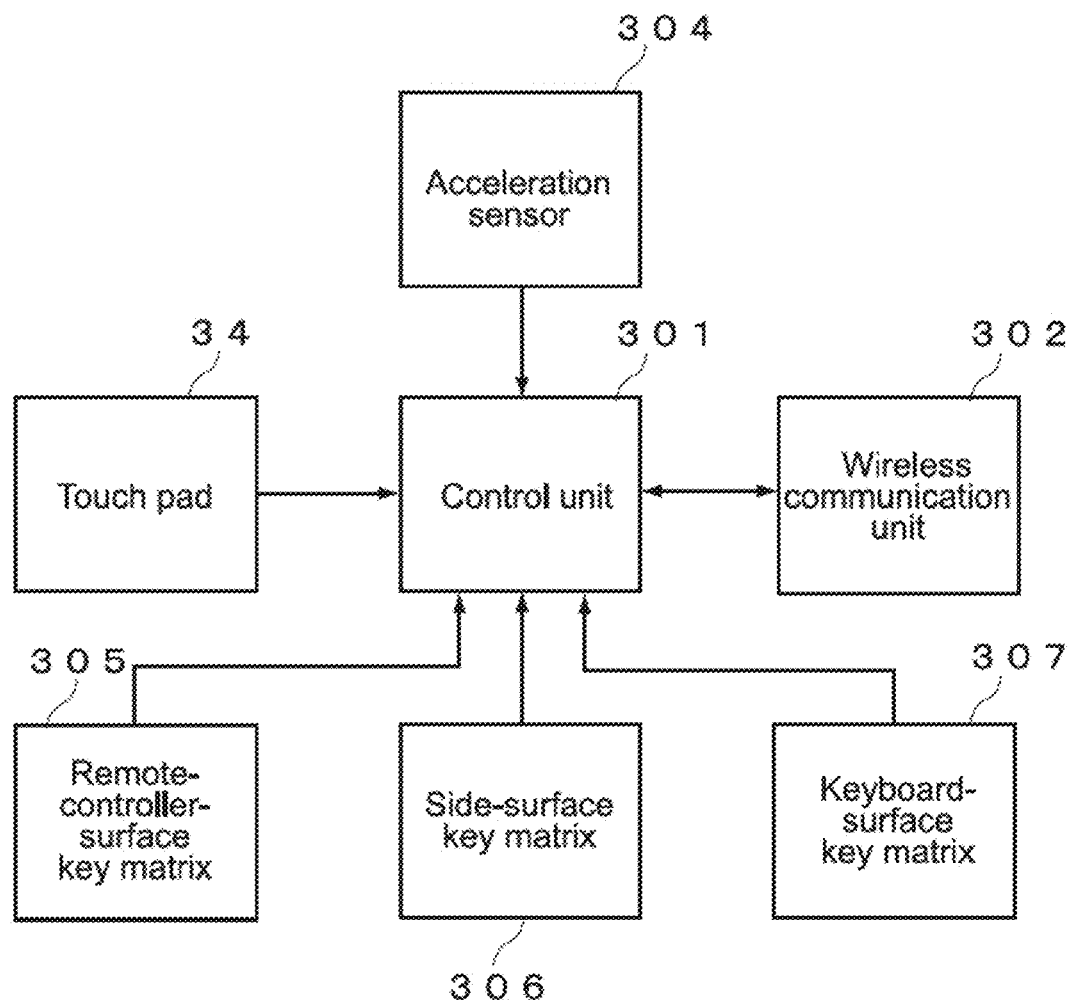
FIG. 5 A block diagram showing a hardware configuration of the operation apparatus of FIG. 1.

FIG. 5 is a block diagram showing a hardware configuration of the operation apparatus 300.

The operation apparatus 300 includes a control unit 301, a wireless communication unit 302, the touch pad 34, an acceleration sensor 304, a remote-controller-surface key matrix 305, a side-surface key matrix 306, and a keyboard-surface key matrix 307.

The control unit 301 performs an entire control of the blocks constituting the operation apparatus 300, controls various types of arithmetic processing and a data communication between the blocks.

The wireless communication unit 302 performs a wireless bi-directional signal communication with the information processing apparatus 200. Examples of the wireless communication system include an infrared (IR) system, an RF system such as radio frequency for consumer electronics (RF4CE) being an international standard of an RF remote controller for a home electric appliance, and a wireless LAN compatible for IEEE 802.11b standard.

The touch pad 34 is a device that detects coordinates of a position touched by the user. The touch pad 34 is constituted of, for example, a touch sensor of a capacitive system, a resistive film system, or the like.

The acceleration sensor 304 is a sensor that detects an acceleration in three axis (X-axis, Y-axis, and Z-axis) directions. A detection signal of the acceleration sensor 304 is supplied to the control unit 301 and processed as information for detecting the attitude of the operation apparatus 300. Note that a means for detecting the attitude of the operation apparatus 300 includes, in addition to the acceleration sensor 304, a gyro sensor or the like that detects an angle with respect to a direction of gravitational force. In addition, there is, for example, a method of detecting the attitude of the operation apparatus 300 in such a manner that a camera (not shown) captures an image of a periphery as viewed from the operation apparatus 300 and the control unit 301 in the operation apparatus 300, the CPU 201 in the information processing apparatus 200, or the like analyses the captured image.

The remote-controller-surface key matrix 305 detects an operation with respect to a key of the cursor keys 35 and the like provided to the remote-controller surface 31 and notifies the control unit 301 of it.

The side-surface key matrix 306 detects an operation with respect to the keys 37 provided in the side surface 36 of the casing 33 and notifies the control unit 301 of it.

The keyboard-surface 32 key matrix 307 detects an operation with respect to the keyboard 38 and notifies the control unit 301 of it.

<Explanation of Operation>

Next, an operation of the operation apparatus 300 according to this embodiment will be described.

The control unit 301 of the operation apparatus 300 performs the following control based on a conversion program of touch pad detection information incorporated in advance.

The control unit 301 of the operation apparatus 300 determines an operation attitude of the operation apparatus 300 based on a detection result obtained by the acceleration sensor 304 (determination unit).

The attitude when the operation apparatus 300 according to this embodiment is operated includes at least two basic attitudes as follows.

Figure 6:
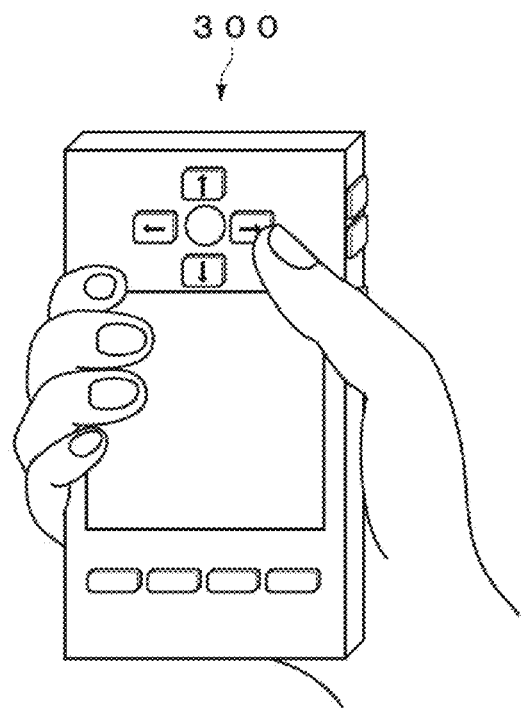
FIG. 6 A view showing a touch pad operation attitude of the operation apparatus of FIG. 1.

1. The attitude in a vertical direction with the remote-controller surface 31 being directed to the user (hereinafter, referred to as "touch pad operation attitude") (see FIG. 6).

Figure 7:
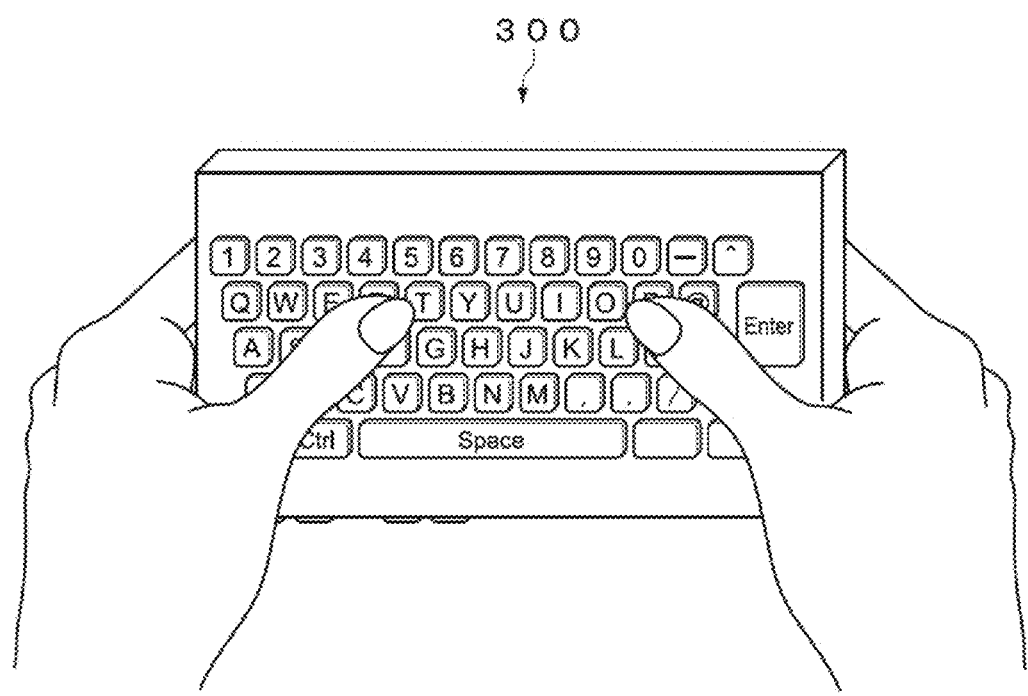
FIG. 7 A view showing a keyboard operation attitude of the operation apparatus of FIG. 1.
Figure 8:
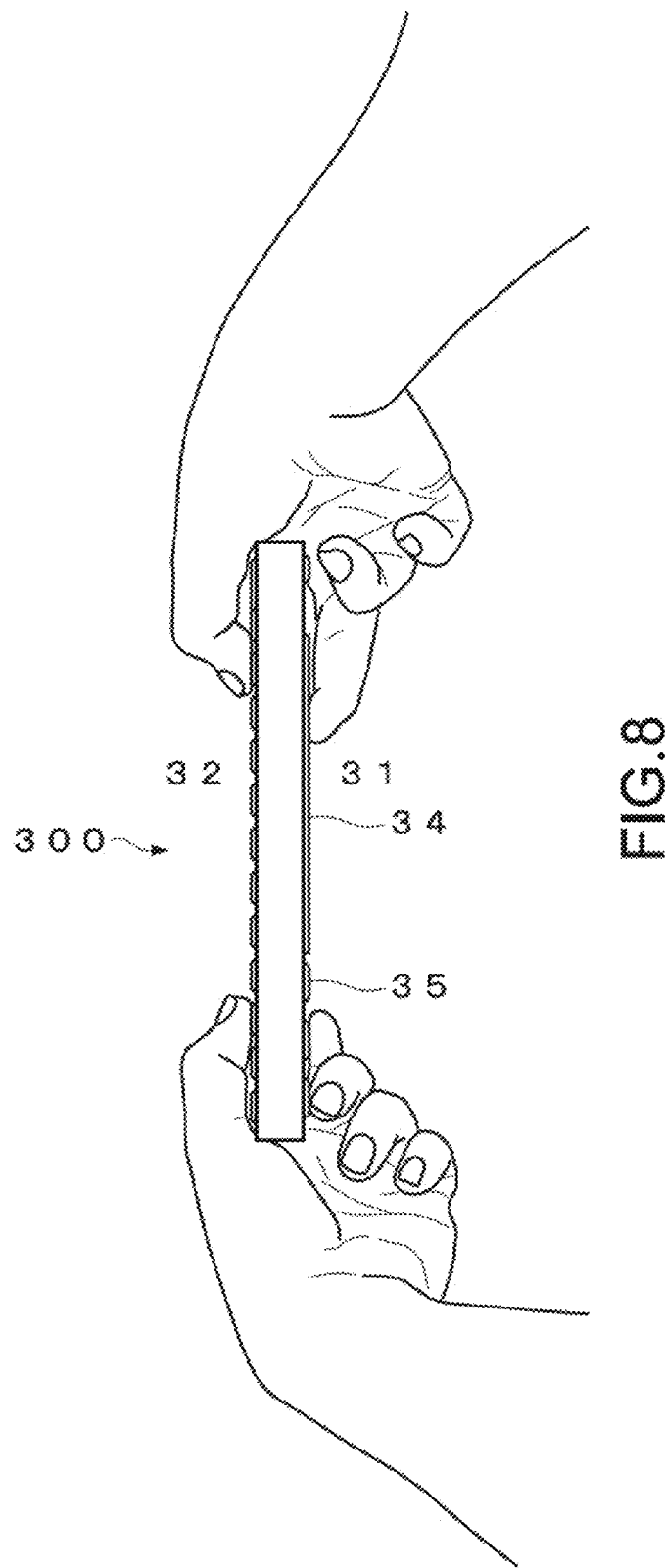
FIG. 8 A view showing a state when the keyboard surface of the operation apparatus of FIG. 1 is directed to the user and a touch pad placed in a back surface thereof is operated in such an attitude.

2. The attitude in a horizontal direction with the keyboard surface 32 being directed to the user (see FIG. 7) (hereinafter, referred to as "keyboard operation attitude"). The use in the horizontal direction is because the key arrangement of the keyboard 38 such as the QWERTY keyboard is long in the horizontal direction. The user performs key inputs with fingers of the both hands holding the both end portions of the operation apparatus 300 with the both hands. Further, when the operation in this attitude is performed, as shown in FIG. 8, the user can also perform an operation of the touch pad 34 sliding the fingers to a back side (remote-controller surface 31 side).

Based on a detection result obtained by the acceleration sensor 304, a method of determining the operation attitude of the operation apparatus 300 includes, for example, the following.

1. The control unit 301 determines, based on the output of the acceleration sensor 304, which of the remote-controller surface 31 and the keyboard surface 32 is more directed in the direction of gravitational force. The control unit 301 determines that it is in the keyboard operation attitude if the remote-controller surface 31 is more directed in the direction of gravitational force, and determines that it is in the touch pad operation attitude if the keyboard surface 32 is more directed in the direction of gravitational force.

2. It is determined that which of the longitudinal direction and the short direction of the operation apparatus 300 is more directed in the direction of gravitational force. The control unit 301 determines that it is in the touch pad operation attitude if the longitudinal direction of the operation apparatus 300 is more directed in the direction of gravitational force, and determines that it is in the keyboard operation attitude if the short direction is more directed in the direction of gravitational force.

3. The two determination methods above are both used. That is, if the control unit 301 determines that the remote-controller surface 31 is more directed in the direction of gravitational force and the short direction is more directed in the direction of gravitational force, the control unit 301 determines that it is in the keyboard operation attitude. Further, if the control unit 301 determines that the keyboard surface 32 is more directed in the direction of gravitational force and the longitudinal direction is more directed in the direction of gravitational force, the control unit 301 determines that it is in the touch pad operation attitude. In Other cases, the control unit 301 ignores them.

Figure 9:
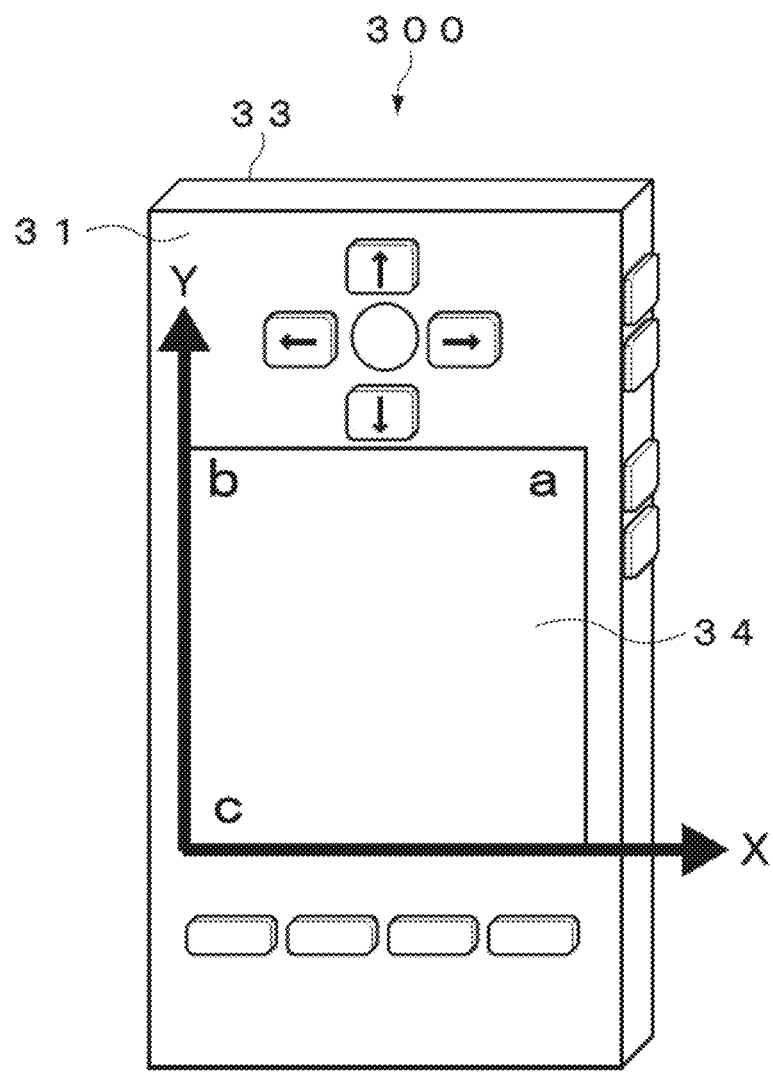
FIG. 9 A view for explaining a coordinate system of the touch pad of the operation apparatus of FIG. 1.

When the control unit 301 determines the touch pad operation attitude, the control unit 301 keeps the output information of the touch pad 34 valid. Here, the coordinate system of the coordinate detection space of the touch pad 34 is, as shown in FIG. 9, one with the left- and right-hand directions being the X-axis direction and the upper and lower directions being the Y-axis direction assuming that a point c at a lower left end of the touch pad 34 being reference coordinates (X=0, Y=0).

Figure 10:
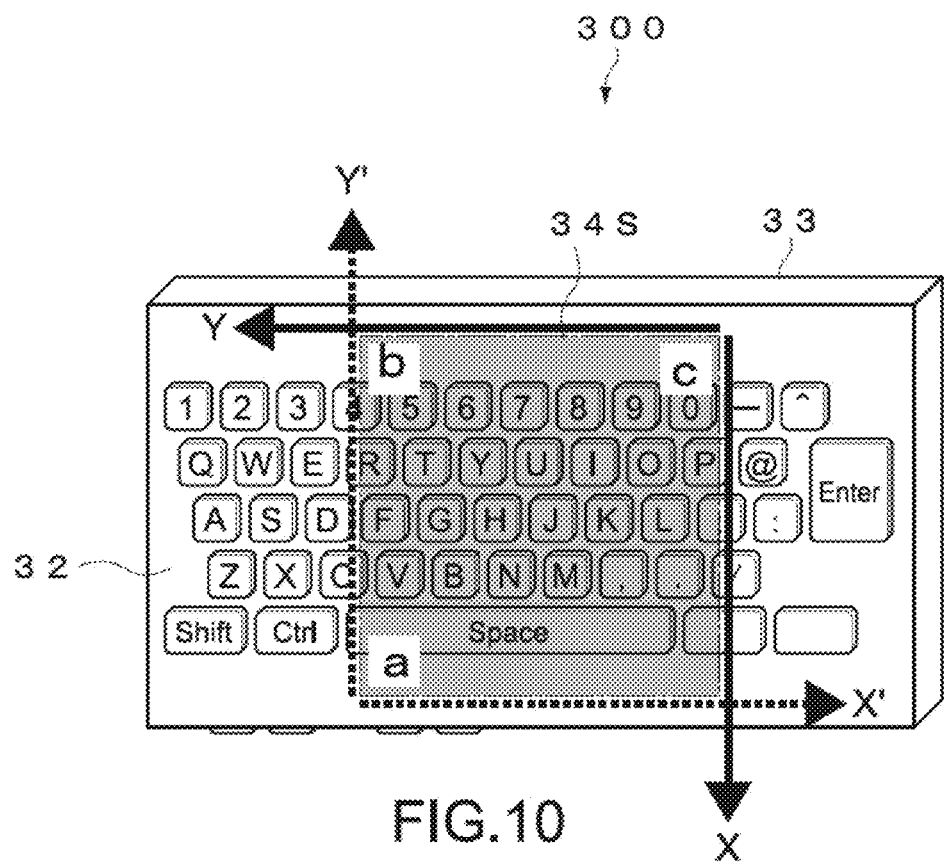
FIG. 10 A view for explaining a coordinate system of the coordinate detection space of the touch pad seen through from a side of the keyboard surface in the operation apparatus of FIG. 1.

In contrast, as shown in FIG. 10, if it is in the keyboard operation attitude, the coordinate system of the coordinate detection space of the touch pad 34 and a coordinate system of a coordinate detection space 34S of the touch pad 34 seen through from the keyboard surface 32 are in a mirror symmetrical and 180-degrees rotational symmetrical relationship. Therefore, if it is determined that it is in the keyboard operation attitude, the control unit 301 converts coordinates (X, Y) detected by the touch pad 34 into coordinates (X', Y') of the coordinate system of the coordinate detection space 34S of the touch pad 34 seen through from the keyboard surface 32 by the following calculation (converter).

$$X' = \alpha - Y$$

$$Y' = \beta - X$$

Where α denotes a length of the touch pad 34 in the Y-axis direction and β denotes a length of the touch pad 34 in the X-axis direction.

Note that, here, it is assumed that the touch pad 34 has an identical length in the X-axis direction and the Y-axis direction. In contrast, if the length in the X-axis direction is different from that in the Y-axis direction (if coordinate detection space of touch pad 34 is rectangular), upon the above-mentioned conversion, the values of Y and X employed in those calculation formula only need to be adjusted by scale conversion, center correction, both of them, or the like depending on an aspect ratio.

By converting the coordinates detected with respect to the operation of the touch pad 34 in the keyboard operation attitude into the coordinates of the coordinate system of the coordinate detection space 34S of the touch pad 34 seen through from the keyboard surface 32 in this manner, the operation of the touch pad 34 in the keyboard operation attitude can be performed according to a user's sense of the coordinate system.

By the way, if the operation input units are provided in the back and front of the casing 33 as described above, there is a possibility in that the key and the like of the operation input unit in the back as viewed from the user are erroneously operated. Therefore, in the operation apparatus 300 according to this embodiment, the control unit 301 performs a control to put the operation input unit provided in the back surface as viewed from the user in a stop state depending on the operation attitude determined based on the output of the acceleration sensor 304. For example, if it is determined that it is in the keyboard operation attitude, the control unit 301 performs a control to put a detection with respect to an operation of the key such as the cursor keys 35 provided in the remote-controller surface 31 in the stop state. This makes it possible to prevent an erroneous operation of the operation input unit provided in the back surface as viewed from the user.

Modified Example 1

Next, a modified example of the above-mentioned embodiment will be described.

An operation apparatus 300A according to this modified example is different from the above-mentioned embodiment in the two basic attitudes upon operation.

1a. The attitude in the lateral direction with the remote-controller surface 31 being directed to the user (hereinafter, referred to as "second touch pad operation attitude") (see FIG. 11).

2b. The attitude in the lateral direction with the keyboard surface 32 being directed to the user (see FIG. 12) (hereinafter, referred to as "keyboard operation attitude"). This keyboard operation attitude is the same as that of the above-mentioned embodiment.

Figure 11:
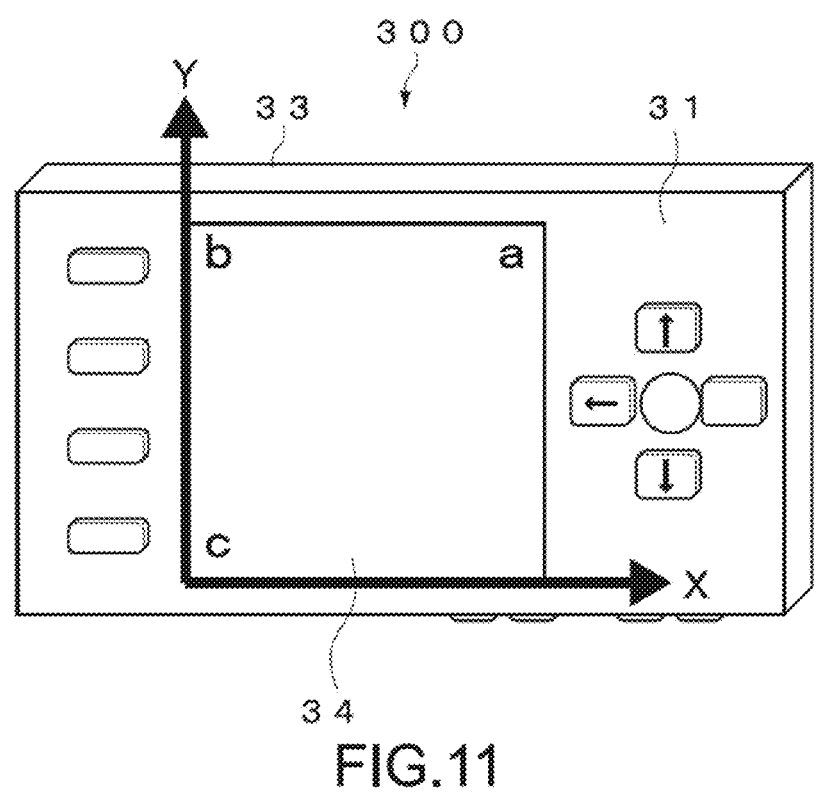
FIG. 11 A view showing a second touch pad operation attitude of an operation apparatus according to Modified example 1.
Figure 12:
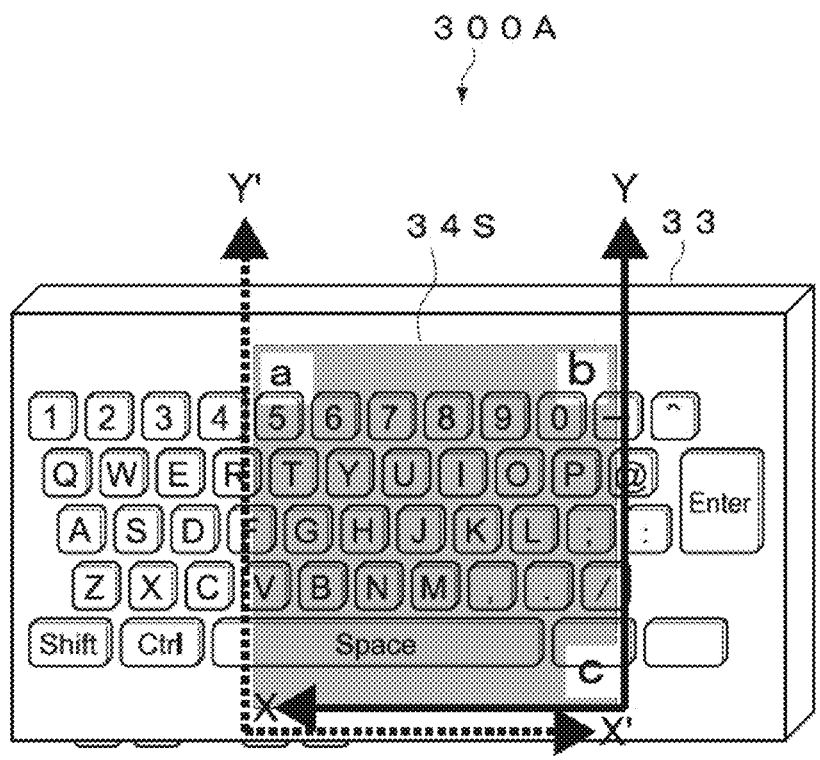
FIG. 12 A view showing a touch pad operation attitude of the operation apparatus according to Modified example 1.

As shown in FIG. 11, if it is determined that it is in the second touch pad operation attitude, the control unit 301 keeps the output information of the touch pad 34 valid. In contrast, as shown in FIG. 12, if it is in the keyboard operation attitude, the coordinate system of the touch pad 34 and the coordinate system of the coordinate detection space 34S of the touch pad 34 seen through from the keyboard surface 32 are in a mirror symmetrical relationship. Therefore, if it is determined that it is in the keyboard operation attitude, the control unit 301 of the operation apparatus 300A converts the coordinates (X, Y) detected by the touch pad 34 into the coordinates (X', Y') of the coordinate system of the coordinate detection space 34S of the touch pad 34 seen through from the keyboard surface 32 by the following calculation.

$$X' = \alpha - X$$

$$Y' = Y$$

Where α denotes a length of the touch pad 34 in the Y-axis direction.

Note that, in this Modified example 1, based on a detection result obtained by the acceleration sensor 304, the operation attitude of the operation apparatus 300A is determined, for example, in the following manner.

1. The control unit 301 determines which of the remote-controller surface 31 and the keyboard surface 32 is more directed in the direction of gravitational force based on the output of the acceleration sensor 304. The control unit 301 determines that it is in the keyboard operation attitude if it is determined that the remote-controller surface 31 is more directed in the direction of gravitational force, and determines that it is in the touch pad operation attitude if it is determined that the keyboard surface 32 is more directed in the direction of gravitational force.

By converting the coordinates of the coordinate system of the touch pad 34 detected with respect to the operation of the touch pad 34 in the keyboard operation attitude into the coordinates of the coordinate system of the coordinate detection space 34S of the touch pad 34 seen through from the keyboard surface 32 in this manner, the operation of the touch pad 34 in the keyboard operation attitude can be performed according to a user's sense of the coordinate system.

Modified Example 2

Next, Modified Example 2 of the above-mentioned embodiment will be described.

In the above, the case where the coordinates detected by the touch pad 34 are subjected to the conversion processing has been described.

In this Modified Example 2, not the coordinates but the movement information (movement amount and movement direction), more specifically, a difference between the coordinates between two points of detection elements such as the fingers moving per unit time is set as a conversion processing target.

In this case, calculation formulae for converting movement information (x, y) detected by the touch pad 34 into movement information (x', y') in the coordinate system of the coordinate detection space 34S of the touch pad 34 seen through from the keyboard surface 32 are as follows.

Assuming that the attitude in the vertical direction with the remote-controller surface 31 being directed to the user and the attitude in the horizontal direction with the keyboard surface 32 being directed to the user are basic attitudes upon operation, $$x'=-y$$

$$y'=-x$$

Further, assuming that the attitude in the horizontal direction with the remote-controller surface 31 being directed to the user and the attitude in the horizontal direction with the keyboard surface 32 being directed to the user are basic attitudes upon operation, $$x'=-x$$

$$y'=y$$

Note that, here, it is assumed that the touch pad 34 has an identical length in the X-axis direction and the Y-axis direction. In contrast, if the length in the X-axis direction is different from that in the Y-axis direction (coordinate detection space of touch pad 34 is rectangular), upon the above-mentioned conversion, the values of Y and X employed in those calculation formula only need to be adjusted by scale conversion, center correction, both of them, or the like depending on an aspect ratio.

Modified Example 3

Controls of the conversion of the coordinates, the stop of the key detection, and the like according to the above-mentioned embodiment and modified examples may be performed not by the control unit 301 of the operation apparatus 300 but by the CPU 201 (FIG. 2) of the information processing apparatus 200 being a control target of the operation apparatus 300. In the case where the operation apparatus 300 and the information processing apparatus 200 are capable of performing a relatively high speed wireless communication, for example, an RF signal, a wireless LAN, and the like, a control by the CPU 201 of the information processing apparatus 200 also can obtain a real-time property sufficient in practice.

Modified Example 4

In the above-mentioned embodiment, the attitude of the operation apparatus 300 is determined using the acceleration sensor 304. However, based on an image captured by a camera provided to the operation apparatus 300, the attitude of the operation apparatus 300 may be determined.

Figure 13:
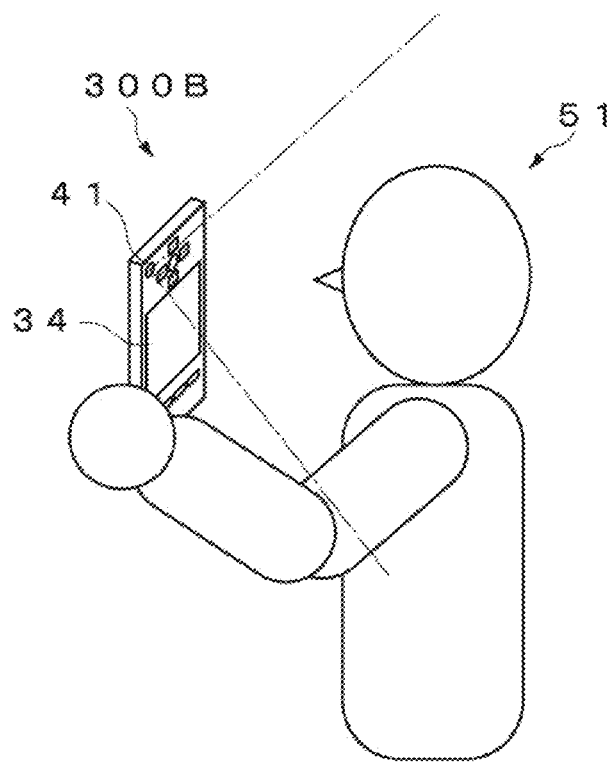
FIG. 13 A view for explaining an attitude detection method by an operation apparatus according to Modified Example 4.
Figure 14:
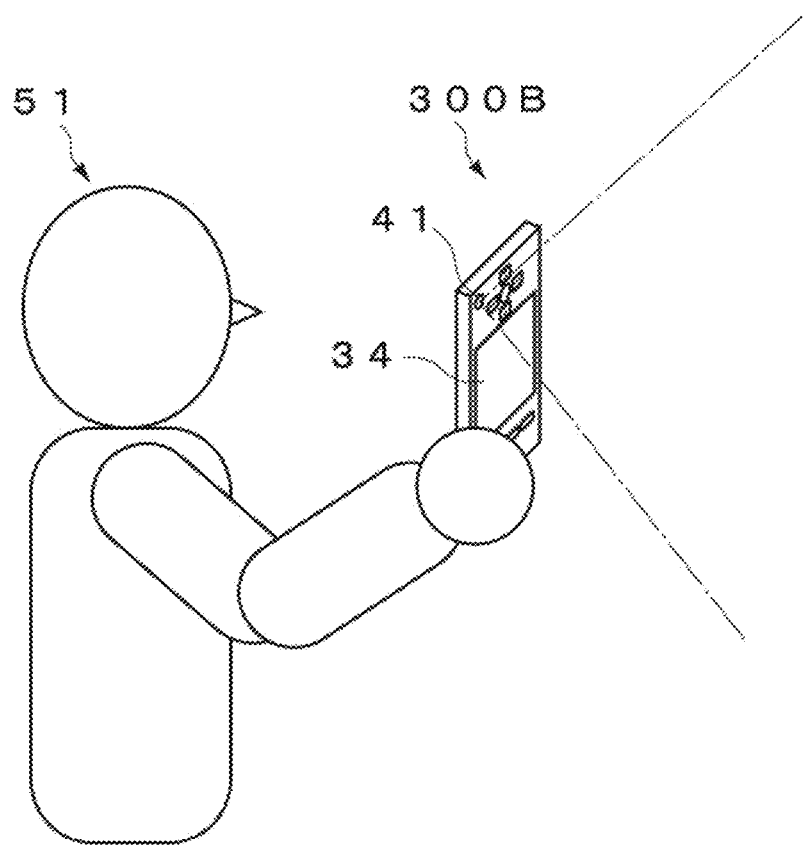
FIG. 14 Another view for explaining the attitude detection method by the operation apparatus according to Modified Example 4.

FIGS. 13 and 14 are views each showing a state in which an attitude of an operation apparatus 300B is determined based on an image captured by a camera provided to the operation apparatus 300B.

In the operation apparatus 300B, a lens 41 of the camera is provided to either one of the remote-controller surface 31 and the keyboard surface 32. In the illustrated example, the lens 41 of the camera is provided on a side of the remote-controller surface.

The control unit 301 of the operation apparatus 300B recognizes a user 51 by, for example, pattern matching of an image of the face of the user 51 that is captured by the camera. If the recognized user 51 matches a user registered in advance, the control unit 301 determines that the operation apparatus 300B is in an attitude in which the remote-controller surface 31 is directed to the user 51 (see FIG. 13). In contrast, if the registered face of the user is not recognized, the control unit 301 determines that the operation apparatus 300B is in an attitude in which the keyboard surface 32 is directed to the user 51 (see FIG. 14).

Further, by combining the determination of the attitude by the camera with a determination result of the horizontal/vertical attitude of the operation apparatus 300B by the acceleration sensor 304, it is also possible to set it as a final determination result of the attitude of the operation apparatus 300B.

This makes it possible to accurately determine the attitude of the operation apparatus 300B. For example, the operation apparatus 300B may be operated at a position lower than the height of the eyes of the user 51 or may be operated at a position higher than the height of the eyes of the user 51. According to the method of Modified Example 3, the touch pad operation attitude and the keyboard operation attitude can be accurately determined in both the states.

Modified Example 5

In the state in which the detection element such as the finger is detected in the touch pad 34, the determination of the touch pad operation attitude and the keyboard operation attitude based on the captured image of the camera or the output of the acceleration sensor 304 may be invalidated.

Figure 15:
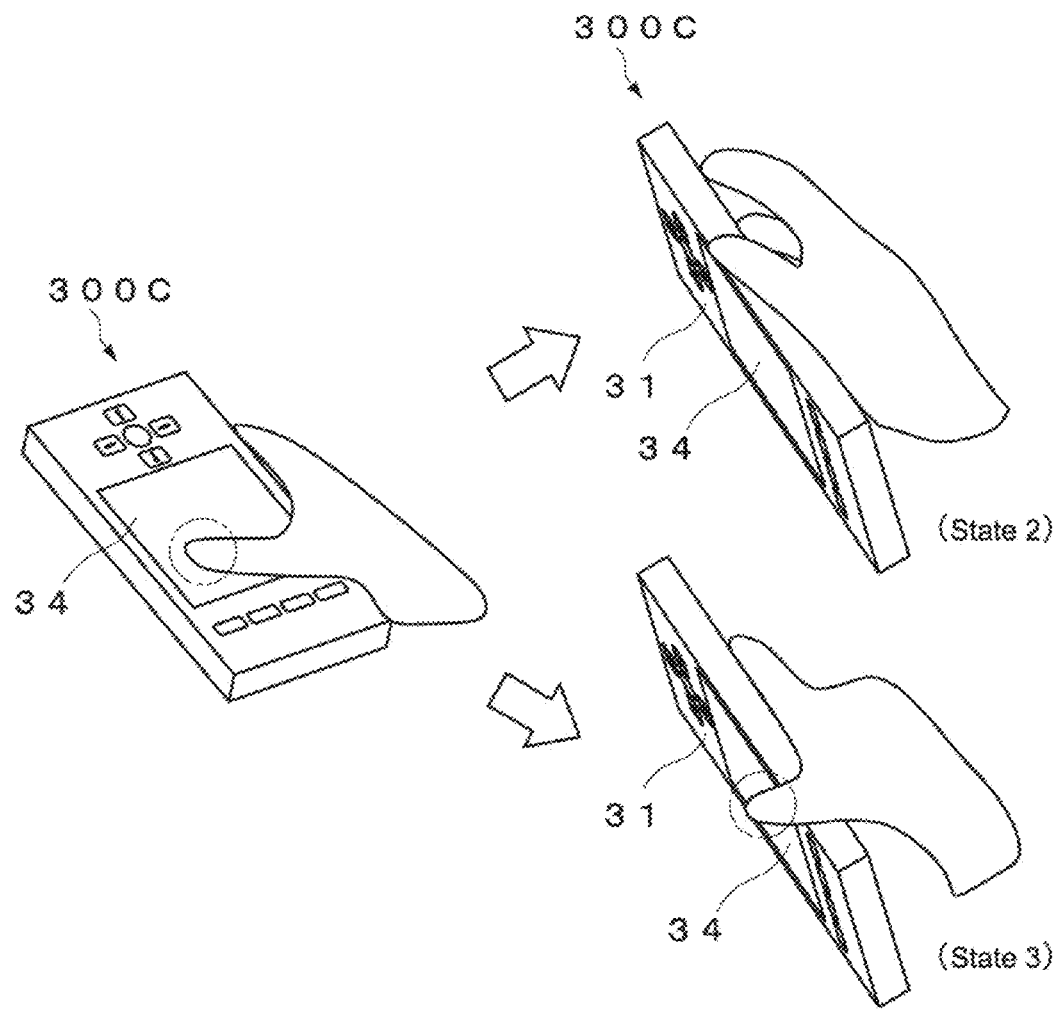
FIG. 15 A view for explaining an operation apparatus according to Modified Example 5.

FIG. 15 is a view showing a state of this control.

When an attitude of an operation apparatus 300C is changed from the touch pad operation attitude (State 1) to an attitude in which the remote-controller surface 31 is more directed in the direction of gravitational force (State 2), the control unit 301 determines, based on the output of the acceleration sensor 304, that the attitude of the operation apparatus 300C changes to the keyboard operation attitude. At this time, if the finger or the like is in contact with the touch pad 34 (State 3), that is, if information is output from the touch pad 34, the control unit 301 invalidates the determination of the touch pad operation attitude and the keyboard operation attitude based on the captured image of the camera and the output of the acceleration sensor 304. With this, the control is performed assuming that the attitude of the operation apparatus 300C remains in the touch pad operation attitude.

With this, by the change of the attitude that occurs upon input operation in the remote-controller surface 31, it is possible to prevent the detection of the operation of the key present in the remote-controller surface 31 from being stopped despite the intention of the user.

In a similar principle, in a state in which depression of the key of the keyboard 38 is detected in the keyboard operation attitude, the determination of the touch pad operation attitude and the keyboard operation attitude based on the captured image obtained by the camera and the output of the acceleration sensor 304 may be invalidated.

In addition, as long as the operation button of the remote-controller surface is operated at a frequency higher than a predetermined value determined in view of the frequency upon a normal operation, the determination of the touch pad operation attitude and the keyboard operation attitude based on the output of the acceleration sensor 304 may be invalidated and the control in the touch pad operation attitude may be performed.

Similarly, as long as the key of the keyboard 38 is operated at a frequency higher than a predetermined value determined in view of the frequency upon a normal operation, the determination of the touch pad operation attitude and the keyboard operation attitude based on the output of the acceleration sensor 304 may be invalidated and the control in the keyboard operation attitude may be performed.

Note that the present technology may also take the following configurations.

(1) An operation apparatus, including:
a casing including two surfaces opposed in front and back directions as a first surface and a second surface;
a first operation input unit that is provided in the first surface and includes a detector that performs a detection of an operation of a user with respect to a predetermined coordinate detection space on the first surface;
a second operation input unit provided in the second surface;
a determination unit that determines an attitude of the casing when an operation of the user with respect to the coordinate detection space of the detector is performed from a side of the second surface; and
a converter that converts, when the attitude is determined, information detected by the detector into information of a coordinate system of the coordinate detection space seen through from the side of the second surface.

(2) The operation apparatus according to (1), in which the detector detects coordinates specified by the user with respect to the coordinate detection space, and
the converter performs a conversion by calculation formulae $$X'=\alpha-Y$$

$$Y'=\beta-x$$

where coordinates detected by the detector are denoted by (X, Y), detection coordinates in a coordinate system of the coordinate detection space seen through from the side of the second surface are denoted by (X', Y'), a length of the coordinate detection space in a Y-axis direction is denoted by $\alpha$, and a length of the coordinate detection space in an X-axis direction is denoted by $\beta$.

(3) The operation apparatus according to (1) or (2), in which the first operation input unit includes one or more key operation units together with the detector,
further including a control unit that puts a detection of an operation of the key operation unit in a stop state when the attitude is determined.

(4) The operation apparatus according to any one of (1) to (3), in which
the control unit puts the determination of the attitude in the stop state when information is output from the detector.

(5) The operation apparatus according to any one of (1) to (4), in which the control unit puts the determination of the attitude in the stop state when the second operation input unit is operated.

(6) The operation apparatus according to any one of (1) to (4), in which
the determination unit includes an imaging unit that is capable of capturing an image of a front side of either one of the first surface and the second surface, and
the control unit determines the attitude together with the image captured by the imaging unit.

(7) The operation apparatus according to (1), in which
the detector detects coordinates specified by the user with respect to the coordinate detection space, and
the converter performs a conversion by calculation formulae $$X'=\alpha-X$$

$$Y'=Y$$

where detection coordinates obtained in a coordinate system of the coordinate detector are denoted by (X, Y), detection coordinates in the coordinate system of the space seen through from the side of the second surface are denoted by (X', Y'), and a length of a detection space of the coordinate detector in a Y-axis direction is denoted by $\alpha$.

(8) The operation apparatus according to (7), in which
the first operation input unit includes one or more key operation units together with the detector,
further including a control unit that puts a detection of an operation of the key operation unit in a stop state when the attitude is determined.

(9) The operation apparatus according to (7) or (8), in which
the determination unit puts the determination of the attitude in the stop state when information is output from the detector.

(10) The operation apparatus according to any one of (7) to (9), in which
the control unit puts the determination of the attitude in the stop state when the second operation input unit is operated.

(11) The operation apparatus according to any one of (7) to (10), in which
the determination unit includes an imaging unit that is capable of capturing an image of a front side of either one of the first surface and the second surface, and
the control unit determines the attitude together with the image captured by the imaging unit.

(12) The operation apparatus according to (1), in which
the detector detects movement information according to an operation of the user with respect to the coordinate detection space, and
the converter performs a conversion by calculation formulae $$x'=-x$$

$$y'=y$$

where the movement information detected by the coordinate detector is denoted by (x, y) and movement information in the coordinate system of the coordinate detection space seen through from the side of the second surface is denoted by (x', y').

(13) The operation apparatus according to (12), in which
the first operation input unit includes one or more key operation units together with the detector,
further including a control unit that puts a detection of an operation of the key operation unit in a stop state when the attitude is determined.

(14) The operation apparatus according to (12) or (13), in which
the determination unit puts the determination of the attitude in the stop state when information is output from the detector.
(15) The operation apparatus according to any one of (12) to (14), in which
the control unit puts the determination of the attitude in the stop state when the second operation input unit is operated.
(16) The operation apparatus according to any one of (12) to (15), in which
the determination unit includes an imaging unit that is capable of capturing an image of a front side of either one of the first surface and the second surface, and
the control unit determines the attitude together with the image captured by the imaging unit.
(17) The operation apparatus according to (1), in which
the detector detects movement information according to an operation of the user with respect to the coordinate detection space, and
the converter performs a conversion by calculation formulae $$x'=-x$$

$$y'=y$$

where movement information obtained in the coordinate system of the coordinate detector is denoted by (x, y) and movement information of the coordinate system of the coordinate detection space seen through from the side of the second surface is denoted by (x', y').
(18) The operation apparatus according to (17), in which
the first operation input unit includes one or more key operation units together with the detector,
further including a control unit that puts a detection of an operation of the key operation unit in a stop state when the attitude is determined.
(19) The operation apparatus according to (17) or (18), in which
the determination unit puts the determination of the attitude in the stop state when information is output from the detector.
(20) The operation apparatus according to any one of (17) or (19), in which
the control unit puts the determination of the attitude in the stop state when the second operation input unit is operated.
(21) The operation apparatus according to any one of (17) to (20), in which
the determination unit includes an imaging unit that is capable of capturing an image of a front side of either one of the first surface and the second surface, and
the control unit determines the attitude together with the image captured by the imaging unit.
Note that the present technology is not limited to the above-mentioned embodiment and may be variously modified within a range of the technical concept of the present technology.

DESCRIPTION OF SYMBOLS 31 remote-controller surface
32 keyboard surface
33 casing
34 touch pad
34S coordinate detection space
35 cursor key
38 keyboard
100 information processing system
200 information processing apparatus
201 CPU
300 operation apparatus
301 control unit
304 acceleration sensor
305 remote-controller-surface key matrix
306 side-surface key matrix
307 keyboard-surface key matrix

The invention claimed is:
1. An operation apparatus, comprising:
a casing including two surfaces opposed in front and back directions as a first surface and a second surface;
a first operation input unit that is provided in the first surface and includes a detector that performs a detection of an operation of a user with respect to a predetermined coordinate detection space on the first surface;
a second operation input unit provided in the second surface;
a determination unit that determines an attitude of the casing when an operation of the user with respect to the coordinate detection space of the detector is performed from a side of the second surface; and
a converter that converts, when the attitude is determined, information detected by the detector into information of a coordinate system of the coordinate detection space seen through from the side of the second surface.
2. The operation apparatus according to claim 1, wherein
the detector detects coordinates specified by the user with respect to the coordinate detection space, and
the converter performs a conversion by calculation formulae

$$X'=\alpha-Y$$

$$Y'=\beta-X$$

where coordinates detected by the detector are denoted by (X, Y), detection coordinates in a coordinate system of the coordinate detection space seen through from the side of the second surface are denoted by (X', Y'), a length of the coordinate detection space in a Y-axis direction is denoted by $\alpha$, and a length of the coordinate detection space in an X-axis direction is denoted by $\beta$.
3. The operation apparatus according to claim 2, wherein
the first operation input unit includes one or more key operation units together with the detector,
further comprising a control unit that puts a detection of an operation of the key operation unit in a stop state when the attitude is determined.
4. The operation apparatus according to claim 3, wherein
the control unit puts the determination of the attitude in the stop state when information is output from the detector.
5. The operation apparatus according to claim 4, wherein
the control unit puts the determination of the attitude in the stop state when the second operation input unit is operated.
6. The operation apparatus according to claim 5, further comprising an imaging unit that is capable of capturing an image of a front side of either one of the first surface and the second surface, in which
the determination unit determines the attitude based on the image captured by the imaging unit.
7. The operation apparatus according to claim 1, wherein
the detector detects coordinates specified by the user with respect to the coordinate detection space, and
the converter performs a conversion by calculation formulae $$X'=\alpha-X$$

$$Y'=Y$$

where detection coordinates obtained in a coordinate system of the coordinate detector are denoted by (X, Y), detection coordinates in the coordinate system of the space seen through from the side of the second surface are denoted by (X', Y'), and a length of a detection space of the coordinate detector in a Y-axis direction is denoted by $\alpha$.

8. The operation apparatus according to claim 1, wherein
the detector detects movement information according to an operation of the user with respect to the coordinate detection space, and
the converter performs a conversion by calculation formulae $$x'=-y$$

$$y'=-x$$

where the movement information detected by the coordinate detector is denoted by (x, y) and movement information in the coordinate system of the coordinate detection space seen through from the side of the second surface is denoted by (x', y').

9. The operation apparatus according to claim 1, wherein
the detector detects movement information according to an operation of the user with respect to the coordinate detection space, and
the converter performs a conversion by calculation formulae $$x'=-x$$

$$y'=y$$

where movement information obtained in the coordinate system of the coordinate detector is denoted by (x, y) and the movement information of the coordinate system of the coordinate detection space seen through from the side of the second surface is denoted by (x', y').

10. An information processing method for an operation apparatus, comprising:
determining an attitude of a casing including a first surface in which a first operation input unit is provided and a second surface in which a second operation input unit is provided, the first operation input unit including a detector that performs a detection of an operation of a user with respect to a predetermined coordinate detection space, the second surface being opposed to the first surface in front and back directions, the attitude of the casing being an attitude when an operation of the user with respect to the coordinate detection space of the detector is performed from a side of the second surface; and
converting, when the attitude is determined, information detected by the detector into information of a coordinate system of the coordinate detection space seen through from the side of the second surface.

11. An information processing apparatus, comprising:
a casing including two surfaces opposed in front and back directions as a first surface and a second surface;
a first operation input unit that is provided in the first surface and includes a detector that performs a detection of an operation of a user with respect to a predetermined coordinate detection space on the first surface;
a second operation input unit provided in the second surface;
a determination unit that determines an attitude of the casing when an operation of the user with respect to the coordinate detection space of the detector is performed from a side of the second surface; and
a converter that converts, when the attitude is determined, information detected by the detector into information of a coordinate system of the coordinate detection space seen through from the side of the second surface.

* * * * *